United States Patent [19]

Jones

[11] Patent Number: 5,169,810
[45] Date of Patent: Dec. 8, 1992

[54] PROCESS FOR FORMING TIN-ZIRCONIA CERAMICS

[75] Inventor: Anthony G. Jones, Sedgefield, England

[73] Assignee: Tioxide Group Services Limited, London, England

[21] Appl. No.: 726,225

[22] Filed: Jul. 5, 1991

[30] Foreign Application Priority Data

Jul. 19, 1990 [GB] United Kingdom ............... 9015890

[51] Int. Cl.$^5$ ............................................. C04B 35/58
[52] U.S. Cl. ...................................... 501/96; 501/103
[58] Field of Search .................. 501/96, 104, 102, 103

[56] References Cited

U.S. PATENT DOCUMENTS

| 4,626,517 | 12/1986 | Watanabe et al. .................. 501/96 |
| 4,748,138 | 5/1988 | Watanabe et al. . |

FOREIGN PATENT DOCUMENTS

| 0157487 | 10/1985 | European Pat. Off. . |
| 0373848A3 | 6/1990 | European Pat. Off. . |
| 61-59267 | 12/1986 | Japan . |
| 63-166761 | 7/1988 | Japan . |
| 63-222071 | 9/1988 | Japan . |
| 1-040058 | 2/1989 | Japan . |
| WO88/00578 | 1/1988 | PCT Int'l Appl. . |
| 2181723 | 4/1987 | United Kingdom . |
| WO9006906 | 6/1990 | World Int. Prop. O. . |

*Primary Examiner*—William R. Dixon, Jr.
*Assistant Examiner*—Chris Gallo

[57] ABSTRACT

A process for forming ceramics comprises mixing titanium nitride with an average particle size less than 0.2 micron, zirconia having a particle size less than 1 micron and a stabilizing agent for stabilizing the zirconia in the tetragonal or cubic phase forming the mixture into a desired shape and firing at between 1300° and 1700° C.

Preferably the stabilizing agent is in the form of coating on the zirconia.

The process is suitable for forming hard and tough ceramics which are electroconducting and can be shaped by electro-discharge machining. It is particularly suitable for forming ceramics containing between 70 and 90% by weight titanium nitride.

16 Claims, No Drawings

PROCESS FOR FORMING TIN-ZIRCONIA CERAMICS

This invention relates to ceramics and in particular to a process for forming tough and hard ceramics.

It is known that transition metal nitrides and, in particular, titanium nitride can be converted into ceramics which have excellent properties such as hardness, chemical stability and electrical conductivity. These ceramics are, however, generally brittle.

It is also known that tough ceramics can be produced from zirconia which has been stabilised so that a substantial proportion exists in the tetragonal or cubic phase. Such ceramics, however, do not possess the hardness of titanium nitride ceramics and are difficult to shape needing the use of such techniques as diamond machining.

Ceramics have been prepared from a mixture of stabilised zirconia and nitrides according to European Patent Application EP 157 487A and International Patent Application WO 88/00578.

However, EP 157 487 provides a method for the production of such ceramics over a limited composition range and the ceramics produced are relatively weak, having a strength of 60 to 170 MPa. International Application WO 88/00578 provides a method for the production of stronger ceramics but the range of compositions which produce strong ceramics is still limited. In particular compositions containing greater than 70% titanium nitride are relatively weak.

It is an object of this invention to provide a process for the formation of strong ceramics from mixtures of nitrides and zirconia which possess desirable combinations of toughness and hardness over a wider composition range than is provided by the prior art.

According to the invention a process for the preparation of a ceramic comprises forming a mixture of titanium nitride powder having an average particle size of less than 0.2 micron, zirconia powder having an average particle size of less than 1 micron and a stabilising agent for stabilising a substantial proportion of the zirconia in the tetragonal or cubic crystalline phase at room temperature, forming the mixture into a desired shape and heating the mixture in an atmosphere with a low partial pressure of oxygen at a temperature between 1300° C. and 1700° C.

The titanium nitride powder used in the process has an average particle size less than 0.2 micron and preferably less than 0.06 micron. The titanium nitride may be produced by any appropriate method and a suitable method is provided in UK Patent Application GB 2 217 699.

The amounts of titanium and nitrogen present in the titanium nitride need not necessarily correspond with titanium nitride of precise chemical composition. Generally the amounts may correspond to titanium nitrides of empirical formula $Ti_xN_y$ where the molar ratio x to y is within the range 0.85 to 1.25 and preferably 0.90 to 1.20.

Oxygen can also be present as an impurity in the titanium nitride in an amount up to 10% by weight.

The particle size of the zirconia used in the process is less than 1 micron and preferably is less than 0.1 micron.

A substantial proportion of the zirconia is stabilised in the tetragonal or cubic crystalline phase at room temperature in the ceramic produced and in order to achieve this a stabilising agent is present in the mixture formed in the process. Suitable stabilising agents are oxides of magnesium, calcium, strontium, barium, scandium, yttrium or cerium and mixtures of these oxides. A particularly suitable stabilising agent is yttrium oxide.

The stabilising agent may be present as an intimate mixture with zirconia, this intimate mixture being produced before mixing with the titanium nitride. For example the intimate mixture may be produced by mixing a powdered stabilising agent with zirconia powder, subjecting the mix to calcination and grinding to form stabilised zirconia of an appropriate size. Alternatively an intimate mixture of zirconia and, for example, yttrium oxide may be formed by coprecipitating hydrous zirconia and hydrous yttria from aqueous solution, calcining the coprecipitate thus formed and grinding to form a stabilised zirconia powder.

Advantageously the stabilising agent is present as a coating on the particles of zirconia as is provided in UK Patent Application GB 2 181 723. When the zirconia particles have a coating of stabilising agent the coating may be a mixed coating and other oxides may also be present in the coating, as described in GB 2 181 723.

The amount of stabilising agent present in the mixture of this invention is sufficient to ensure that a substantial proportion of the zirconia is present in the ceramic in the tetragonal or cubic crystalline phase at room temperature. Preferably the proportion of zirconia in the tetragonal or cubic phase is at least 80% by weight. Suitable amounts of stabilising agent will depend upon the actual agent used and upon the desired proportion of stabilised zirconia. Typically from 0.5 to about 20 mole % based on moles of zirconia is used. Preferably, when yttrium oxide is used, 1.25 to 5 mole % based on moles of zirconia is present.

The amount of titanium nitride present in the mixture formed in the process of the invention is usually between 5 and 95% by weight of the mixture. Preferably, the mixture contains from 50 to 95% by weight titanium nitride and, most preferably, the proportion of titanium nitride is 70 to 90% by weight.

The components of the mixture are mixed together by any convenient means although it is advantageous to mix them by milling them together in a liquid. The milled mixture is then dried before shaping.

After forming into a desired shape by any suitable means the mixture is fired in an inert atmosphere with a low partial pressure of oxygen. A nitrogen or argon atmosphere is suitable and preferably the partial pressure of oxygen does not exceed 1 Pa.

The mixture is heated at a temperature between 1300° and 1700° C. If desired a pressure may be applied to the mixture whilst it is being heated and when a pressure is so applied the temperature used is at the lower end of the above range.

The ceramics formed by the process of this invention are strong, hard and tough. They are electrically conducting and can be shaped by electro-discharge machining. The ability to be so shaped is important as it avoids the need to use diamond machining for these hard materials. The ceramics may be used as cutting tools and in applications where they are subjected to highly corrosive or erosive conditions such as automotive engine components and wire extrusion dies.

The invention is illustrated by the following Examples.

EXAMPLE 1

Titanium nitride having an average particle size of 0.06 microns and zirconia coated with 2.5 mol % $Y_2O_3$ having a crystal size of 0.08 microns were milled together in various proportions in isopropanol for 16 hours. The slurry was dried to a powder and uniaxially pressed into discs. The samples were sintered in a furnace under flowing nitrogen with a hold time of 60 minutes at the maximum temperature. The mechanical properties of the samples are shown below in Table 1.

TABLE 1

| Properties of Composites Sintered at 1500° C. and 1700° C. | | | | | |
|---|---|---|---|---|---|
| Wt % Titanium Nitride | Density ($gcm^{-3}$) | (% Theoretical) | Modulus of Rupture (MPa) | Hardness (GPa) | Fracture Toughness ($MPa.m^{\frac{1}{2}}$) |
| (a) Sintered at 1500° C. | | | | | |
| 60 | 5.43 | 98 | 643 | | |
| 80 | 4.65 | 87 | 545 | | |
| (b) Sintered at 1700° C. | | | | | |
| 20 | 5.84 | 99 | 1113 | 12.8 | 7.6 |
| 50 | 5.65 | 100 | 990 | 13.8 | 5.3 |
| 70 | 5.48 | 100 | 670 | 13.8 | 4.1 |
| 90 | 5.32 | 100 | 660 | 13.8 | 3.1 |

EXAMPLE 2

Titanium nitride having an average particle size of 0.06 micron and a commercially available zirconia (Tosoh 2.5Y) which is doped with 2.5 mole % $Y_2O_3$ were milled together in two different proportions in isopropanol for 16 hours. The slurry was dried to a powder which was treated at 1700° C. as in Example 1. The mechanical properties of the ceramic produced are given in Table 2.

TABLE 2

| Properties of Composites Sintered at 1700° C. | | | | | |
|---|---|---|---|---|---|
| Wt. % Titanium Nitride | Density ($gcm^{-3}$) | (% Theoretical) | Modulus of Rupture (MPa) | Hardness (GPa) | Fracture Toughness ($MPa.m^{\frac{1}{2}}$) |
| 50 | 5.26 | 94 | 850 | 9.0 | 6.0 |
| 75 | 5.44 | 100 | 953 | 11.2 | 5.2 |

EXAMPLE 3

Titanium nitride having an average particle size of 0.15 micron and a commercially available zirconia (Tosoh 2.5Y) which is doped with 2.5 mole % $Y_2O_3$ were milled together in the proportion of 75 pts titanium nitride to 25 pts zirconia by weight in isopropanol for 16 hours. The slurry was dried to a powder which was treated at 1700° C. as in Example 1. The properties of the ceramic produced were as follows:
Density 5.1 g $cm^{-3}$ (95% of theoretical density)
Modulus of Rupture 618 MPa.

EXAMPLE 4

Example 3 was repeated using titanium nitride having an average particle size of 0.08 micron. The properties of the ceramic produced were as follows:
Density 5.4 g $cm^{-3}$ (100% of theoretical density)
Modulus of Rupture 740 MPA.

EXAMPLE 5 (COMPARATIVE)

A commercially available (H. C. Stark) titanium nitride with an average particle size of 0.5 microns was milled with commercially available zirconia (Tosoh 2.5Y) as used in Example 2 using the same technique as in Example 2. The powder produced was fired at 1700° C. as described in Example 1. The mechanical properties of the ceramics formed are given in Table 3 below.

TABLE 3

| Properties of Composites Sintered at 1700° C. | | | |
|---|---|---|---|
| Wt % Titanium Nitride | Density ($gcm^{-3}$) | (% Theoretical) | Modulus of Rupture |
| 50 | 4.49 | 80 | 425 |
| 75 | 5.01 | 93 | 573 |

I claim:

1. A process for the preparation of a ceramic comprising forming a mixture of titanium nitride powder having an average particle size of less than 0.2 micron, zirconia powder having an average particle size of less than 0.1 micron and a stabilizing agent for stabilizing a substantial proportion of the zirconia in the tetragonal or cubic crystalline phase at room temperature, forming the mixture into a desired shape and heating the mixture in an atmosphere with a low partial pressure of oxygen at a temperature between 1300° C. and 1700° C., the titanium nitride being present in an amount between 70 and 90 per cent by weight of the mixture.

2. A process according to claim 1 in which the average size of the titanium nitride particles is less than 0.06 micron.

3. A process according to claim 1 in which the stabilising agent is selected from the group consisting of oxides and mixtures of oxides of magnesium, calcium, stronitum, barium, scandium, yttrium and cerium.

4. A process according to claim 1 in which an intimate mixture of zirconia and stabilising agent is produced before this intimate mixture is mixed with the titanium nitride.

5. A process according to claim 4 in which the intimate mixture is formed by coating the particles of zirconia with the stabilising agent.

6. A process according to claim 1 in which the stabilising agent is present in an amount between 0.5 and 20 mole per cent based on moles of zirconia present.

7. A process according to claim 1 in which the stabilising agent is yttrium oxide and is present in an amount of from 1.25 to 5 mole per cent based on moles of zirconia present.

8. A process according to claim 1 in which the partial pressure of oxygen is less than 1 Pa.

9. A process according to claim 1 in which the mixture is heated in an atmosphere of nitrogen or argon.

10. A process according to claim 1 in which the molar ratio Ti:N in the titanium nitride is within the range 0.85 to 1.25.

11. A process according to claim 10 in which the molar ratio is within the range 0.90 to 1.20.

12. A process according to claim 1 in which the titanium nitride contains oxygen as an impurity in an amount less than 10 per cent by weight.

13. A process according to claim 1 in which the mixture is prepared by milling together the components of the mixture in a liquid.

14. A process according to claim 1 in which a pressure is applied to the mixture while the mixture is being heated at a temperature between 1300° C. and 1700° C.

15. A ceramic prepared by a process according to any one of the preceding claims.

16. A ceramic according to claim 15 in which the proportion of the zirconia which is present in the tetragonal or cubic crystalline phase is at least 80 per cent by weight.

* * * * *